US009846924B2

(12) United States Patent
Pacheco et al.

(10) Patent No.: US 9,846,924 B2
(45) Date of Patent: Dec. 19, 2017

(54) SYSTEMS AND METHODS FOR DETECTION AND REMOVAL OF SHADOWS IN AN IMAGE

(71) Applicant: Dell Products L.P., Round Rock, TX (US)

(72) Inventors: Roman Joel Pacheco, Leander, TX (US); Abu Shaher Sanaullah, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/082,211

(22) Filed: Mar. 28, 2016

(65) Prior Publication Data
US 2017/0278226 A1 Sep. 28, 2017

(51) Int. Cl.
G06K 9/40 (2006.01)
G02F 1/01 (2006.01)
G06T 5/00 (2006.01)
G06T 7/00 (2017.01)
G06T 5/50 (2006.01)

(52) U.S. Cl.
CPC .............. *G06T 5/008* (2013.01); *G06T 5/50* (2013.01); *G06T 7/0022* (2013.01); *G06T 7/0065* (2013.01); *G06T 2207/10024* (2013.01); *G06T 2207/10048* (2013.01)

(58) Field of Classification Search
CPC . G06T 5/008; G06T 5/50; G06T 2207/10024; G06T 2207/10048; G06T 5/001; G06T 5/40; H04N 9/045; H04N 1/6027; H04N 1/60; H04N 5/33; H04N 5/332; H04N 3/09; G01J 5/02; G01J 2005/0077
USPC ......... 382/167, 174, 274, 164; 348/160–164, 348/165–166; 250/307–318, 330–333; 374/124
See application file for complete search history.

(56) References Cited

U.S. PATENT DOCUMENTS

| 6,661,918 | B1* | 12/2003 | Gordon | G06K 9/38 382/164 |
| 7,693,331 | B2* | 4/2010 | Porikli | G06K 9/00624 382/174 |
| 8,311,360 | B2* | 11/2012 | Rai | H04N 1/4072 358/3.27 |
| 8,976,249 | B2* | 3/2015 | Kim | H04N 5/33 348/160 |
| 9,008,457 | B2* | 4/2015 | Dikmen | G06T 5/008 382/274 |
| 9,245,332 | B2* | 1/2016 | Matthews | G06K 9/6289 |
| 9,398,288 | B2* | 7/2016 | Kim | H04N 5/33 |
| 9,582,889 | B2* | 2/2017 | Shpunt | H04N 13/0239 |

* cited by examiner

Primary Examiner — Sheela C Chawan
(74) Attorney, Agent, or Firm — Jackson Walker L.L.P.

(57) ABSTRACT

In accordance with embodiments of the present disclosure, an information handling system may include a processor and a non-transitory computer-readable medium embodying a program of instructions. The program of instructions may be configured to, when read and executed by the processor, receive a visible-light image from a visible-light sensor, receive an infrared image from an active infrared sensor, and compare the visible-light image to the infrared image to determine shadow regions of the visible-light image having shadows.

21 Claims, 3 Drawing Sheets

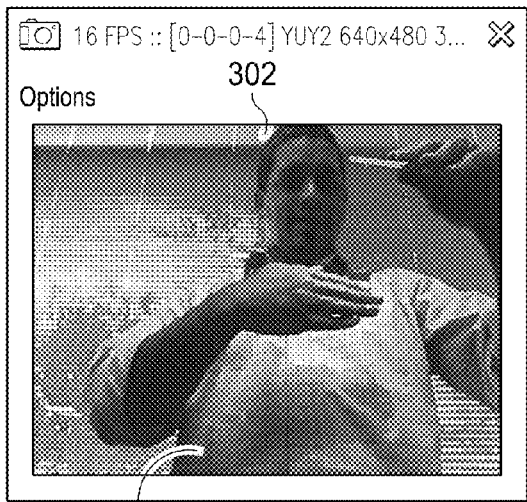
FIG. 3A
FIG. 3B
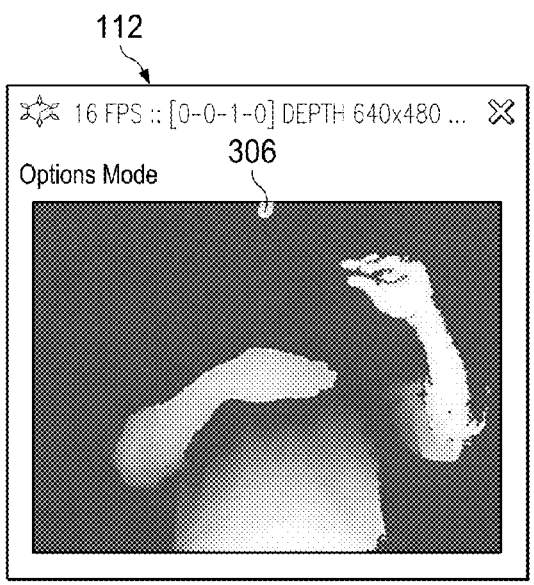
FIG. 3C ical field of information.

SYSTEMS AND METHODS FOR DETECTION AND REMOVAL OF SHADOWS IN AN IMAGE

TECHNICAL FIELD

The present disclosure relates in general to information handling systems, and more particularly, to video and/or still image capture and removal of shadows from an image.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include cameras for capturing images, whether videos or still images. Such images may be used in many applications, including teleconferencing applications or simply capturing images for entertainment, documentation, business, or other purposes.

In many image capture scenarios, the presence of strong shadows is undesirable and degrades the quality of the image. If such images are taken of written material, such shadows may reduce legibility or readability of content. Such shadows may be present in numerous scenarios, including when subjects are under uneven lighting conditions or when capturing images outdoors in bright sunlight.

While some existing techniques may be used to reduce shadowing, such techniques may have shortcomings. For example, exposure levels in high-dynamic range (HDR) may be over-exposed or under-exposed and not set properly in shadow areas.

SUMMARY

In accordance with the teachings of the present disclosure, one or more disadvantages and problems associated with reduction of shadows in images may be reduced or eliminated.

In accordance with embodiments of the present disclosure, an information handling system may include a processor and a non-transitory computer-readable medium embodying a program of instructions. The program of instructions may be configured to, when read and executed by the processor, receive a visible-light image from a visible-light sensor, receive an infrared image from an active infrared sensor, and compare the visible-light image to the infrared image to determine shadow regions of the visible-light image having shadows.

In accordance with these and other embodiments of the present disclosure, a method may include receiving a visible-light image from a visible-light sensor, receiving an infrared image from an active infrared sensor, and comparing the visible-light image to the infrared image to determine shadow regions of the visible-light image having shadows.

In accordance with these and other embodiments of the present disclosure, an article of manufacture may include a non-transitory computer readable medium and computer-executable instructions carried on the non-transitory computer readable medium, the instructions readable by a processor. The instructions, when read and executed, may cause the processor to receive a visible-light image from a visible-light sensor, receive an infrared image from an active infrared sensor, and compare the visible-light image to the infrared image to determine shadow regions of the visible-light image having shadows.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 3A-3C illustrate example images captured by sensors of the example camera depicted in FIG. 2, in accordance with embodiments of the present disclosure.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
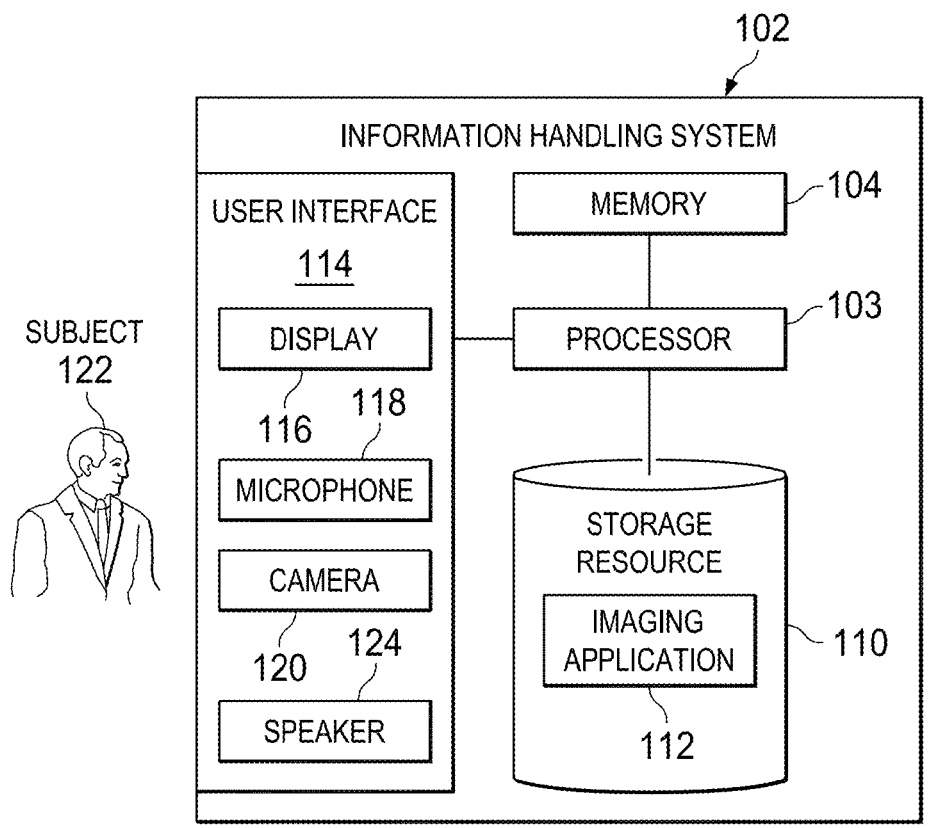
FIG. 1 illustrates a block diagram of an example image capture system, in accordance with embodiments of the present disclosure.

FIG. 1 illustrates a block diagram of an example image capture system comprising an information handling system 102, in accordance with embodiments of the present disclosure. In certain embodiments, information handling system 102 may comprise a personal computer (e.g., a desktop computer or a portable computer). In these and other embodiments, information handling system 102 may comprise a mobile device (e.g., smart phone, a tablet computing device, a handheld computing device, a personal digital assistant, or any other device that may be readily transported on a person of a user of such mobile device). In these and other embodiments, information handling system 102 may comprise a Voice over Internet Protocol (VoIP) phone (e.g., a purpose-built hardware device that appears much like an ordinary landline telephone). In these and other embodiments, information handling system 102 may comprise a video camera assembly. In these and other embodiments, information handling system 102 may comprise a still camera assembly.

As depicted in FIG. 1, information handling system 102 may include a processor 103, a memory 104 communicatively coupled to processor 103, a storage resource 110 communicatively coupled to processor 103, and a user interface 114 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in its memory 104, storage resource 110, and/or another component of information handling system 102.

Memory 104 may be communicatively coupled to its associated processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Each storage resource 110 may include a system, device, or apparatus configured to store data. A storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within its associated information handling system 102. However, in other embodiments, storage resource 110 may reside external to its associated information handling system 102 (e.g., may be coupled to information handling system 102 via a network).

As shown in FIG. 1, a storage resource 110 may have stored thereon an imaging application 112. Imaging application 112 may comprise a program of instructions which a processor 103 may read and execute to process images captured by camera 120 to reduce or eliminate undesired shadows from a visible light image captured by a visual light sensor of camera 120, as described in greater detail below. When executed, active portions of imaging application 112 may be loaded from storage resource 110 into memory 104 for execution by processor 103. Although imaging application 112 is depicted in FIG. 1 as being locally stored to a storage resource 110 of an information handling system 102, in some embodiments, imaging application 112 may be stored externally or remotely from an information handling system 102 and accessible to such information handling system 102 via a network, and loaded by processor 103 from such network (e.g., such imaging application 112 may be a streaming application).

User interface 114 may comprise any instrumentality or aggregation of instrumentalities by which a participant subject 122 may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a participant 122 (e.g., via a display device, speaker, and/or other data output device). As shown in FIG. 1, user interface 114 may include one or more of a display 116, microphone 118, camera 120, and speaker 124.

A display 116 may comprise any suitable system, device, or apparatus configured to display human-perceptible graphical data and/or alphanumeric data to a participant 122. For example, in some embodiments, display 116 may comprise a liquid crystal display.

A microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMs) microphone, etc.) wherein such sound is converted to an electrical signal using a diaphragm or membrane having an electrical capacitance that varies as based on sonic vibrations received at the diaphragm or membrane.

A camera 120 may comprise any system, device, or apparatus configured to record images (moving or still) into one or more electrical signals that may be processed by processor 103. In some embodiments, camera 120 may comprise a multiple-sensor camera configured to capture multiple types of images, such as multiple-sensor camera 120 depicted in FIG. 2 and described in greater detail below. In operation, camera 120 may capture images of a subject 122, which may be a person (including, without limitation, a user of information handling system 102), animal, or other object.

A speaker 124 may comprise any system, device, or apparatus configured to produce sound in response to electrical audio signal input. In some embodiments, a speaker 124 may comprise a dynamic loudspeaker, which employs a lightweight diaphragm mechanically coupled to a rigid frame via a flexible suspension that constrains a voice coil to move axially through a cylindrical magnetic gap such that when an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

In addition to processor 103, memory 104, storage resource 110, and user interface 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
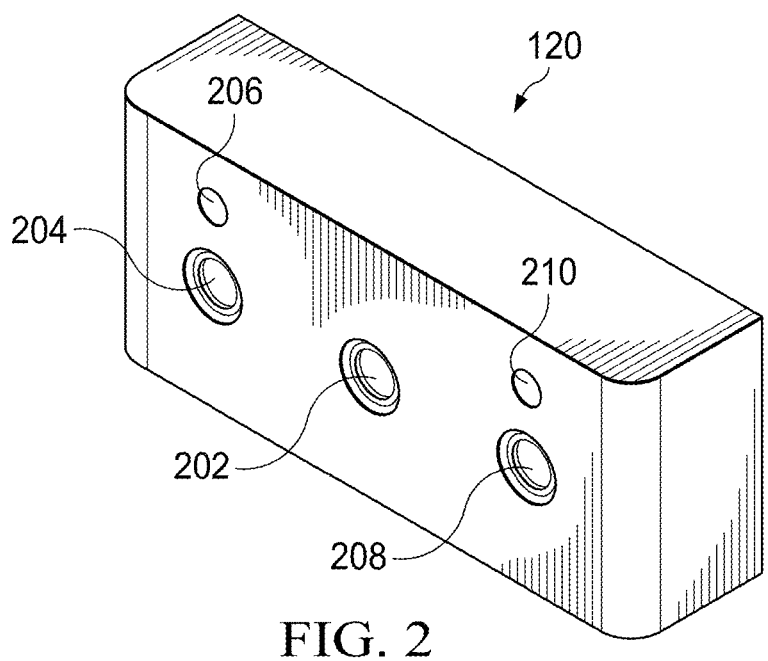
FIG. 2 illustrates an example camera having multiple sensors, in accordance with embodiments of the present disclosure.

FIG. 2 illustrates an example camera 120 having multiple sensors, in accordance with embodiments of the present disclosure. As shown in FIG. 2, camera 120 may include a visible light sensor 202, an active infrared sensor 204, an infrared source 206, a depth sensor 208, and a light source 210.

Visible light sensor 202 may comprise any system, device, or apparatus configured to sense electromagnetic energy in the visible spectrum (e.g., from approximately 400 nanometers in wavelength to approximately 700 nanometers in wavelength) and based on the electromagnetic energy sensed, capture a visible-light image having a plurality of pixels representative of the visible spectrum electromagnetic energy sensed relative to each pixel, such as visible-light image 302 depicted in FIG. 3A. Such visible-light image 302 may be black and white or color. Devices similar to visible light sensor 202 are often simply referred to as "cameras."

Active infrared sensor 204 may comprise any system, device, or apparatus configured to sense electromagnetic energy in the non-visible infrared spectrum (e.g., greater than 700 nanometers in wavelength) and based on the electromagnetic energy sensed, capture an infrared image having a plurality of pixels representative of the infrared spectrum electromagnetic energy sensed relative to each pixel, such as infrared image 304 depicted in FIG. 3B. As its name implies, active infrared sensor 204 senses infrared energy reflected from a subject 122 originating from an active source 206 of infrared energy. Such infrared source 206 may comprise any system, device, or apparatus located in close proximity to infrared sensor 204 which emits infrared radiation (e.g., an infrared lamp for converting electrical energy into electromagnetic radiation in the infrared spectrum).

Depth sensor 208 may comprise any system, device, or apparatus configured to resolve distance based on the known speed of light, measuring a time-of-flight of a light signal between light source 210 and subject 122 for each pixel of the image, and based on the distance sensed, capture a depth image having a plurality of pixels representative of the distance sensed relative to each pixel, such as depth image 306 depicted in FIG. 3C. Light source 210 may comprise any system, device, or apparatus located in close proximity to depth sensor 208 which emits electromagnetic radiation (e.g., visible light or non-visible radiation). In some embodiments, depth sensor 208 may comprise a time-of-flight camera. In other embodiments, depth sensor 208 may comprise a structured light camera. In yet other embodiments, depth sensor 208 may comprise a stereo camera comprising at least two sensors and an optional light source.

Although the foregoing contemplates a separate active infrared sensor 204 and depth sensor 208, in some embodiments, depth sensor 208 and light source 210 may also be capable of capturing two-dimensional infrared images, thus allowing depth sensor 208 to serve the functionality of infrared sensor 204 as well.

In operation, imaging application 112 may receive as inputs a visible-light image 302, an infrared image 304, and a depth image 306, and based thereon, identify potentially unwanted shadows present in the visible-light image 302 (e.g., shadow 308 present in visible-light image 302) and characterize such shadows in order to remove or reduce such shadows. In other words, for each visible-light image 302 captured, a corresponding (e.g., substantially contemporaneous) infrared image 304 and a corresponding (e.g., substantially contemporaneous) depth image 306 are also captured. Because active source 206 may have the effect of illuminating subject 122 like a flashlight from the point of view of camera 120, infrared sensor 204 may not "see" shadows resulting from visible light sources in the environment of subject 122. Thus, a truly dark material may typically appear dark in both the visible-light image 302 and the corresponding infrared image 304, and because a shadow may only appear dark in the visible-light image 302, the visible-light image 302 and its corresponding infrared image 304 may be compared to detect pixel regions in the visible-light image 302 that are dark (e.g., below a predetermined brightness threshold) but have corresponding pixel regions in the infrared image 304 that are not similarly dark. An example of this approach is described in greater detail with respect to FIG. 4, below.

Figure 4:
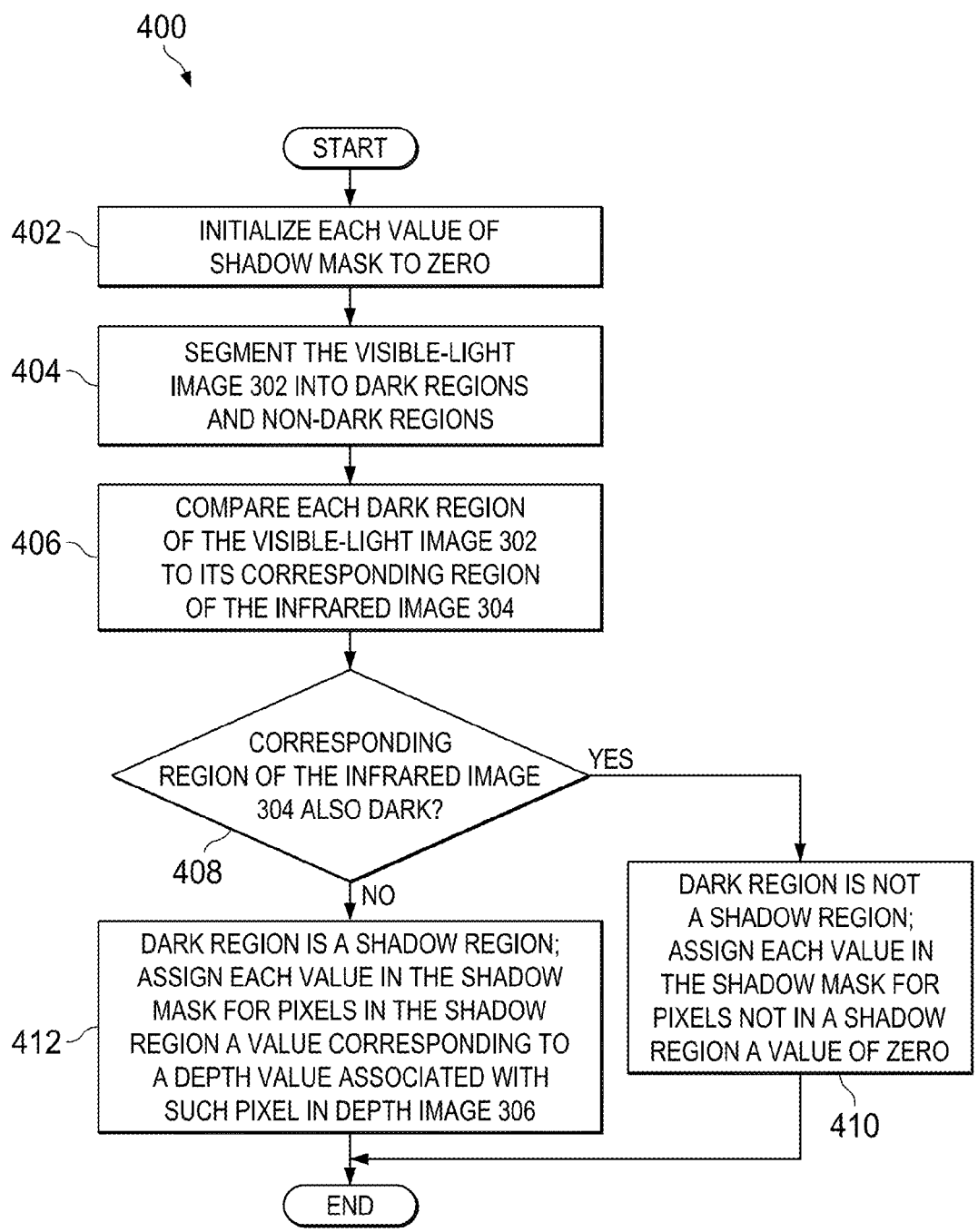
FIG. 4 illustrates a flow chart of an example method for detection and removal of shadows in an image, in accordance with embodiments of the present disclosure.

FIG. 4 illustrates a flow chart of an example method 400 for detection and removal of shadows in an image, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, imaging application 112 may initialize each value of a data structure referred to herein as a shadow mask to zero. Such shadow mask may include a plurality of values, each value corresponding to a pixel of a visible-light image 302.

At step 404, imaging application 112 may segment the visible-light image 302 into dark regions and non-dark regions. For example, imaging application 112 may use an image segmentation algorithm and pre-determined thresholds for brightness and/or colors that are considered "dark." As a result, regions of visible-light image 302, such as shadow 308, may be identified as a dark region while the remainder of the visible-light image 302 may be identified as possessing non-dark regions. In some embodiments, imaging application 112 may also use depth image 306 to automatically classify background pixels (e.g., those pixels outside the infrared sensing range of infrared sensor 204 and the depth sensing range of depth sensor 208 corresponding to black pixels of depth image 306 of FIG. 3C) as non-dark regions. Such automatic classification of background pixels as being in non-dark regions may reduce required image processing resources in cases in which it would be beneficial to remove shadows in foreground objects, but such shadows can be tolerated in background objects (e.g., portrait shots).

At step 406, imaging application 112 may compare each dark region of the visible-light image 302 to its corresponding region of the infrared image 304. At step 408, based on the comparisons, imaging application 112 may determine if each corresponding region of the infrared image 304 is also dark. Such determination may be made according to any standard, such as whether a corresponding region of the infrared image 304 has at least a predetermined number and/or concentration of pixels in the corresponding region of the infrared image 304 that fall below a predetermined brightness threshold for the region to be considered a dark region. For each dark region of visible-light image 302 having a corresponding region of infrared image 304 determined to be dark, method 400 may proceed to step 410. Otherwise, for each dark region of visible-light image 302 having a corresponding region of infrared image 304 determined to not be dark, method 400 may proceed to step 412.

At step 410, in response to a dark region of visible-light image 302 having a corresponding region of infrared image 304 determined not to be dark, meaning that such dark region is a shadow region, imaging application 112 may assign each value in the shadow mask for pixels in the shadow region a value corresponding to a depth value associated with such pixel in depth image 306. Typically, a depth camera may assigns a value of zero to the closest object of an image, and the values increase as the depth of the objects increase. However, in the present disclosure, the depth value assigned in step 410 may employ an inverse of such approach, in which background objects have a depth value of zero, and with increasing values or objects closer to camera 120. After completion of step 410, method 400 may end.

At step 412, in response to a dark region of visible-light image 302 having a corresponding region of infrared image 304 determined to be dark, meaning that such dark region is not a shadow region, imaging application 112 may assign each value in the shadow mask for pixels not in a shadow region a value of zero, indicating that such pixels are not in shadow regions. After completion of step 412, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using one or more information handling systems 102, components thereof, and/or any other system operable to implement method 400. In certain embodiments, method 400 may be implemented partially or fully in software and/or firmware embodied in computer-readable media.

After the shadow mask for the visible-light image 302 is created according to method 400, data of the shadow mask may be processed by imaging application 112 to remove or reduce shadows and render a corrected visible-light image 302 with the shadows removed or reduced. The scope of such shadow reduction based on a shadow mask is outside the scope of this disclosure, although one example technique may involve using the values present in the shadow mask, which are representative of a depth of each pixel in shadow regions, to characterize a surface shape of subjects in the shadow regions in order to edit the visible-light image 302 to reduce or eliminate the appearance of shadows.

It is to be understood that the image analysis approaches discussed above are not limited to the embodiments disclosed above. For example, in analyzing visible-light image 302 to determine dark regions, imaging application 112 may in some embodiments process certain channels of a color image (e.g., a luminance channel). As another example, in some embodiments, sensors 202, 204, and 208 may not be positioned in the exact location and may have differences in resolution and other parameters, such that the systems and methods described above may need to account for differences in the corresponding images 302, 304, and 306. Thus, imaging application 112 may in some embodiments compensate for such differences by adjusting a pixel map to account for offsets between sensors and other sensor parameters. Alternatively, imaging application 112 may use pixel information from infrared image 304 and depth image 306 to detect shadow pixels, and then "grow" to neighboring pixels in the visible-light image 302 that exhibit the same color and/or brightness characteristics as the known shadow pixels.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system, comprising:
a processor; and
a non-transitory computer-readable medium embodying a program of instructions, the program of instructions configured to, when read and executed by the processor:
receive a visible-light image from a visible-light sensor;
receive an infrared image from an active infrared sensor; and
compare the visible-light image to the infrared image to determine shadow regions of the visible-light image having shadows.

2. The information handling system of claim 1, wherein comparing the visible-light image to the infrared image comprises:
segmenting the visible-light image into dark regions and non-dark regions;
comparing each dark region of the visible-light image to a corresponding region of the infrared image; and
for each dark region of the visible-light image, determining the dark region to be shadow region if the corresponding region of the infrared image is not dark.

3. The information handling system of claim 2, the program of instructions further configured to:
receive a depth image from a depth sensor; and
for each shadow region, assign each value in a shadow mask associated with the visible-light image for each pixel of the visible-light image in the shadow region, a value corresponding to a depth value associated with such pixel in the depth image.

4. The information handling system of claim 3, the program of instructions further configured to assign for each value of the shadow mask for each pixel not in any shadow region, a value indicating such pixel is not in a shadow region.

5. The information handling system of claim 2, the program of instructions further configured to:
receive a depth image from a depth sensor; and
analyze the depth image for background regions of the visible-light image;
wherein segmenting the visible-light image into dark regions and non-dark regions comprises segmenting the background regions into non-dark regions.

6. The information handling system of claim 2, the program of instructions further configured to reduce an appearance of shadows in the visible-light image based on the shadow mask.

7. The information handling system of claim 1, the program of instructions further configured to:
receive a depth image from a depth sensor; and
compare the visible-light image to the infrared image and the depth image to determine shadow regions of the visible-light image having shadows.

8. A method, comprising:
receiving a visible-light image from a visible-light sensor;
receiving an infrared image from an active infrared sensor; and
comparing the visible-light image to the infrared image to determine shadow regions of the visible-light image having shadows.

9. The method of claim 8, wherein comparing the visible-light image to the infrared image comprises:
segmenting the visible-light image into dark regions and non-dark regions;
comparing each dark region of the visible-light image to a corresponding region of the infrared image; and
for each dark region of the visible-light image, determining the dark region to be shadow region if the corresponding region of the infrared image is not dark.

10. The method of claim 9, further comprising:
receiving a depth image from a depth sensor; and
for each shadow region, assigning each value in a shadow mask associated with the visible-light image for each pixel of the visible-light image in the shadow region, a value corresponding to a depth value associated with such pixel in the depth image.

11. The method of claim 10, further comprising assigning for each value of the shadow mask for each pixel not in any shadow region, a value indicating such pixel is not in a shadow region.

12. The method of claim 9, further comprising:
receiving a depth image from a depth sensor; and
analyzing the depth image for background regions of the visible-light image;
wherein segmenting the visible-light image into dark regions and non-dark regions comprises segmenting the background regions into non-dark regions.

13. The method of claim 9, further comprising reducing an appearance of shadows in the visible-light image based on the shadow mask.

14. The method of claim 8, further comprising:
receiving a depth image from a depth sensor; and
comparing the visible-light image to the infrared image and the depth image to determine shadow regions of the visible-light image having shadows.

15. An article of manufacture comprising:
a non-transitory computer readable medium; and
computer-executable instructions carried on the non-transitory computer readable medium, the instructions readable by a processor, the instructions, when read and executed, for causing the processor to:
receive a visible-light image from a visible-light sensor;
receive an infrared image from an active infrared sensor; and
compare the visible-light image to the infrared image to determine shadow regions of the visible-light image having shadows.

16. The article of claim 15, wherein comparing the visible-light image to the infrared image comprises:
segmenting the visible-light image into dark regions and non-dark regions;
comparing each dark region of the visible-light image to a corresponding region of the infrared image; and
for each dark region of the visible-light image, determining the dark region to be shadow region if the corresponding region of the infrared image is not dark.

17. The article of claim 16, the instructions for further causing the processor to:
receive a depth image from a depth sensor; and
for each shadow region, assign each value in a shadow mask associated with the visible-light image for each pixel of the visible-light image in the shadow region, a value corresponding to a depth value associated with such pixel in the depth image.

18. The article of claim 17, the instructions for further causing the processor to assign for each value of the shadow mask for each pixel not in any shadow region, a value indicating such pixel is not in a shadow region.

19. The article of claim 16, the instructions for further causing the processor to:
receive a depth image from a depth sensor; and
analyze the depth image for background regions of the visible-light image;
wherein segmenting the visible-light image into dark regions and non-dark regions comprises segmenting the background regions into non-dark regions.

20. The article of claim 16, the instructions for further causing the processor to reduce an appearance of shadows in the visible-light image based on the shadow mask.

21. The article of claim 15, the instructions for further causing the processor to:
receive a depth image from a depth sensor; and
compare the visible-light image to the infrared image and the depth image to determine shadow regions of the visible-light image having shadows.

* * * * *